United States Patent
Chougrani et al.

(10) Patent No.: US 9,371,424 B2
(45) Date of Patent: Jun. 21, 2016

(54) COPOLYMERS HAVING GEM-ACETOPHONE GROUPS

(71) Applicant: CHRYSO, Issy les Moulineaux (FR)

(72) Inventors: Kamel Chougrani, Loury (FR); Frédéric Leising, Avilly Saint Léonard (FR)

(73) Assignee: CHRYSO, Issy les Moulineaux (FR)

( * ) Notice: Subject to any disclaimer, the term of this patent is extended or adjusted under 35 U.S.C. 154(b) by 0 days.

(21) Appl. No.: 14/419,131

(22) PCT Filed: Sep. 26, 2013

(86) PCT No.: PCT/EP2013/070040
§ 371 (c)(1),
(2) Date: Feb. 2, 2015

(87) PCT Pub. No.: WO2014/049037
PCT Pub. Date: Apr. 3, 2014

(65) Prior Publication Data
US 2015/0175752 A1  Jun. 25, 2015

(30) Foreign Application Priority Data

Sep. 27, 2012 (FR) ..................... 12 59124

(51) Int. Cl.
| | |
|---|---|
| C08G 85/00 | (2006.01) |
| C08G 81/02 | (2006.01) |
| C04B 24/24 | (2006.01) |
| C08F 8/14 | (2006.01) |
| C08F 8/40 | (2006.01) |
| C04B 103/32 | (2006.01) |
| C04B 111/20 | (2006.01) |
| C04B 103/00 | (2006.01) |
| C04B 103/40 | (2006.01) |

(52) U.S. Cl.
CPC .............. *C08G 81/025* (2013.01); *C04B 24/24* (2013.01); *C04B 24/246* (2013.01); *C08F 8/14* (2013.01); *C08F 8/40* (2013.01); *C04B 2103/0059* (2013.01); *C04B 2103/32* (2013.01); *C04B 2103/408* (2013.01); *C04B 2111/2015* (2013.01)

(58) Field of Classification Search
CPC .................................................... C08G 81/025
See application file for complete search history.

(56) References Cited

U.S. PATENT DOCUMENTS

| | | |
|---|---|---|
| 5,336,316 A | 8/1994 | Dawson et al. |
| 6,630,565 B1 | 10/2003 | Van den Bergen et al. |
| 2009/0258969 A1 | 10/2009 | Shimoda et al. |
| 2014/0039098 A1 | 2/2014 | Chougrani et al. |

FOREIGN PATENT DOCUMENTS

| | | |
|---|---|---|
| FR | 2776285 A1 | 9/1999 |
| FR | 2892420 A1 | 4/2007 |
| WO | WO 00/39359 A1 | 7/2000 |

OTHER PUBLICATIONS

Mosquet, M., et al., "Polyoxyethylene Di-Phosphonates as Efficient Dispersing Polymers for Aqueous Suspensions", J. Applied Polymer Sci., 1997, vol. 65, pp. 2545-2555.
International Search Report for PCT/EP2013/070040 completed Nov. 7, 2013.

*Primary Examiner* — Wenwen Cai
(74) *Attorney, Agent, or Firm* — Lathrop & Gage LLP; James H. Velema

(57) ABSTRACT

The invention relates to a copolymer comprising a main hydrocarbon chain and side groups including carboxylic groups, polyoxyalkylate groups, and gem acetophosphonate groups, an adjuvant for suspensions of mineral particles comprising said copolymer and a method for preparing said copolymer. Finally it also relates to the use of said copolymer for fluidifying and maintaining fluidity of suspensions of mineral particles and for reducing the sensitivity of hydraulic binders to clays and alkali metal sulfates. Finally it relates to a composition of mineral particles comprising this copolymer.

23 Claims, No Drawings

COPOLYMERS HAVING GEM-ACETOPHONE GROUPS

RELATED APPLICATIONS

This application is a 371 filing of International Application No. PCT/EP2013/070040, filed Sep. 26, 2013, which claims priority to French Patent Application No. 1259124, filed Sep. 27, 2012, the contents of each of which are incorporated herein by reference in their entirety.

The present invention relates to copolymers with gem acetophosphonate groups, to a method for their preparation and to their use as fluidifiers for suspensions of mineral particles, notably compositions of hydraulic binders, for example cement, and gypsum formulations.

STATE OF THE ART

Generally, adjuvants are added to cement compositions for improving their properties. Among the fundamental properties of cement compositions, are found rheological properties and their change over time, related to workability, as well as strengths, notably mechanical strengths.

In particular fluidifiers or plasticizers are used, which have the effect of fluidifying cement compositions and thus allow a reduction in the amount of water added, this is why they are also referred to as water reducers. The composition then has a higher density and results in a material having a larger mechanical strength.

Certain soluble polymers, called superplasticizers, allow further reduction in the amount of water. Superplasticizers of the type of polyalkoxylated polycarboxylic acids (PCP) are notably known.

The document FR 2892420 describes superplasticizers with phosphonate and polyoxyalkylate groups for fluidifying suspensions of mineral particles, in which the phosphonate groups are amino-bisalkylenephosphonic groups of the following formula (A):

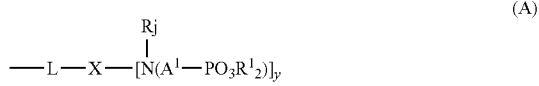

(A)

wherein L represents a group binding to the main chain and X is an alkylene or oxyalkylene group. Phosphonate monomers may be notably obtained by diphosphonation under the conditions of the MOEDRITZER-IRANI reaction, by reaction of an amine with formaldehyde and phosphorous acid.

In order to access these structures, the chemical modification of a polymer by post-grafting is also proposed. This method includes two steps, i.e. the copolymerization of an unsaturated carboxylic acid with a polyethoxylated (meth)acrylic ester followed by grafting of a phosphonate alcohol or amine synthon or, alternatively, the polymerization of the unsaturated carboxylic acid followed by esterification with polyoxyalkylated compounds followed by grafting of a phosphonate synthon.

From Mosquet et al. (Journal of Applied Polymer Sciences, 1997, 65, 2545-255) are also known polymers playing the role of a fluidifier for suspensions of mineral particles. These polymers notably comprise phosphonic or carboxylic functions. This document shows that polymers comprising carboxylic substituents are not as good fluidifiers as polymers comprising phosphonic substituents.

TECHNICAL PROBLEM

The object of the invention is to propose novel modified copolymers useful as adjuvants for suspensions of mineral particles.

Another object is to propose a simple and economical method for preparing these copolymers and in particular not requiring the use of formaldehyde.

A further other object is to propose admixtures for suspensions of mineral particles having a significant water reducing power, good maintenance of rheology, low sensitivity of these performances to fluctuations in soluble sulfate concentration, notably of alkaline sulfates and clays, notably swelling clays.

SUMMARY OF THE INVENTION

The objects mentioned above are attained according to the invention with copolymers including gem acetophosphonic groups.

Also, according to the invention, a copolymer is proposed comprising a main hydrocarbon chain and side groups, in which the side groups comprise carboxylic groups, polyoxyalkylated groups and gem acetophosphonate groups.

According to a second aspect, the invention is directed to a method for preparing these copolymers comprising the steps consisting of:

(i) polymerizing a monomer bearing a carboxylic group, optionally in the presence of a monomer bearing a polyoxyalkylate group; and (ii) grafting the obtained polymer with a gem acetophosphonate reactive compound.

According to a third aspect, the invention is directed to a method for preparing these copolymers by bulk or solution copolymerization, in the presence of a suitable catalyst, of monomers capable of polymerizing respectively bearing the sought groups (carboxylic, gem acetophosphonic and polyoxyalkylate groups).

The thereby obtained gem acetophosphonate copolymer is advantageously formulated before use, preferably as a solution, notably an aqueous solution. The formulation may also include customary additives in this field.

According to another aspect, the invention is therefore directed to an admixture for suspensions of mineral particles comprising the copolymer according to the invention in the form of a solution in a suitable solvent or in dry form, notably in powder.

Moreover, the invention is according to another aspect directed to the use of the copolymer according to the invention for fluidifying suspensions of mineral particles and/or for maintaining workability of hydraulic binders. It is also directed to the use of the copolymer according to the invention for reducing the sensitivity of hydraulic compositions with clays, notably swelling clays and with soluble sulfates, notably alkaline sulfates.

Finally, according to a last aspect, the invention is directed to a composition of mineral particles comprising copolymer according to the invention.

DEFINITIONS

Within the scope of the present discussion, by the term of <<suspension of mineral particles>> or <<hydraulic composition>> is meant any binder with hydraulic setting, a so called hydraulic binder (by the term of <<hydraulic binder>> is meant the designation of any compound having the property of hydrating in the presence of water and the hydration of which gives the possibility of obtaining a solid having mechanical characteristics), i.e. notably in addition to cements, such as Portland cements, aluminous cements, mortars further comprising fine granulates, concretes further comprising coarse granulates or further anhydrous calcium sulfates or semihydrates. By the expression of cement is meant according to the invention, a cement of the CEM I, CEM II, CEM III, CEM IV or CEM V type according to the Ciment NF EN 197-1 standard. The term also encompasses inert mineral fillers such as calcium sulfate dihydrates as well as calcium carbonate, dolomite, silica, titanium hydroxide and clayey compounds. The hydraulic composition may also comprise mineral additions. The expression of mineral additions designates slags (as defined in the Ciment NF EN 197-1 standard paragraph 5.2.2), steelwork slags, pozzolanic materials (as defined in the Ciment NF EN 197-1 standard paragraph 5.2.3), flying ashes (as defined in the Ciment NF EN 197-1 standard paragraph 5.2.4), calcined shales (as defined in the Ciment NF EN 197-1 standard paragraph 5.2.5), lime stones (as defined in the Ciment NF EN 197-1 standard paragraph 5.2.6) or further silica fumes (as defined in the Ciment NF EN 197-1 standard paragraph 5.2.7) or mixtures thereof. Other additions, not presently recognized by the Ciment NF EN 197-1 standard (2001), may also be used. These are notably metakaolins, such as metakaolins of type A according to the NF P 18-513 standard, and siliceous additions, such as siliceous mineralogy additions Qz according to the NF P 18-509 standard.

The composition based on a hydraulic binder is for example a concrete. By the term of concrete is meant a mixture of hydraulic binders, of granulates, of water, optionally of additives, and optionally of mineral additions. Within the scope of the invention, the term of concrete comprises mortars.

By the term of <<hydrocarbon chain>> is meant a group including carbon and hydrogen atoms, aliphatic, saturated or unsaturated, aromatic, arylalkyl or alkylaryl, linear or branched and optionally interrupted and/or terminated by one or several heteroatoms such as S, O, N, P.

By the term of <<gem-acetophosphonated group>> is meant to designate groups including a phosphonate group and an acetate group bound to a same carbon atom. These groups are with formula

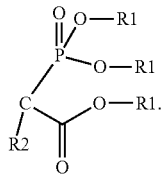

By the term of <<alkyl group>> is meant a linear, branched or cyclic group, generally comprising from 1 to 20 carbon atoms, for example from 1 to 10 carbon atoms.

In the same way by the term of <<alkylene group>> is meant a linear or cyclic alkylene group.

By the term of <<swelling clay>> is meant clays for which the interfoliar spaces occupied by compensating cations are able to swell by adsorbing one or several layers of water.

By the term of <<soluble sulfate>> is meant sulfates comprised in the hydraulic binder which are notably soluble in water, for example in the mixing water. The amount of soluble sulfates is determined in $Na_2O$ equivalents according to the NF EN 196-2 standard. The soluble sulfates are notably alkylene sulfates.

DETAILED DESCRIPTION OF THE INVENTION

The copolymers according to the invention are comb copolymers including a main hydrocarbon chain on the one hand and side groups on the other hand. They are further characterized by the presence as side groups of carboxylic groups, polyoxyalkylate groups and gem acetophosphonate groups.

The simultaneous presence of these three types of groups gives the copolymer interesting properties as an admixture, notably as a superplasticizer, for suspensions of mineral particles. More advantageously, the simultaneous presence of these three types of group allows use of the copolymer at lower dosages, in the suspension of mineral particles than the conventional PCPs not comprising any acetophosphonic group, while guaranteeing interesting properties, notably in terms of maintaining workability, setting time, both early and ultimate mechanical strengths, low sensitivities to soluble sulfates, notably alkylene sulfates and to clays, notably swelling clays.

[Copolymers]

In their broadest definition, the copolymers proposed according to the invention are modified polymers of the PCP type including gem acetophosphonate groups.

The polymer is of the cone type, including a main chain and side groups. The main hydrocarbon chain preferably does not comprise any heteroatoms. A linear main chain is more preferred.

According to the invention, the copolymer moreover comprises side groups including carboxylic groups and polyoxyalkylate groups, and further gem acetophosphonate groups. Advantageously, the polyoxyalkylate side groups are bound to the main chain through an ester, ether or amide bond.

Preferably, the gem acetophosphonated groups fit the formula (IA) below:

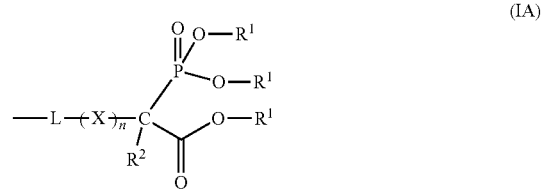

(IA)

wherein:

L represents a group for binding to the main chain, in particular a bond, an oxygen atom, a group $-NR^4-$, ($R^4$ may be a hydrogen or a $C_1$-$C_6$ alkyl group), a sulfur atom or an alkylene group, preferably, L is an oxygen atom or a group $-NR^4-$;

n represents 0 or 1;

X is a spacer group, in particular a $C_1$-$C_{20}$ alkylene group optionally substituted or a sequence of groups of formula $-(QO)_m-$ wherein Q represents an alkylene group with 2 to 4 carbon atoms or a mixture of these alkylene groups, m being an integer varying from 1 to 500, preferably, X is $C_1$-$C_6$ alkylene group;

$R^1$ independently of each other is a monovalent group notably a hydrogen, a $C_1$-$C_6$ alkyl group or a group of formula $-(QO)_mR^5$ wherein Q represents an alkylene group with 2 to 4 carbon atoms or a mixture of these alkylene groups, m is an integer varying from 1 to 500 and $R^5$ is a hydrogen or a $C_1$-$C_3$ alkyl, or $R^1$ is a cation, notably an alkaline, earth alkaline, or ammonium cation; preferably $R^1$ is a hydrogen atom; and $R^2$ is a monovalent group, notably a hydrogen atom or a hydroxyl group or a $C_1$-$C_{10}$ alkyl group, preferably, $R^2$ is a hydroxyl group or a hydrogen atom, notably $R^2$ is a hydrogen atom.

Preferably, in the compounds (Ia), n is equal to 0 or n is equal to 1 and X is a $C_1$-$C_6$ alkylene group.

The group L is most often bound to a carboxylic group of the copolymer and the oxygen atom y consequently forms therein an ester function and the amine groups an amide function.

The proportion of the respective gem acetophosphonate groups in the copolymer according to the invention may widely vary. In particular, the copolymers comprise 0.1 to 60%, in particular 1 to 40% and most particularly 2 to 10% by number of gem acetophosphonated side groups.

The copolymer also includes as side groups, polyoxyalkylate groups. These polyoxyalkylate groups may be directly bound to the main chain or via groups formed with the present carboxylic functions, notably through an ester or amide bond.

They may also be integrated into the gem acetophosphonate groups, notably of formula (I).

The polyoxyalkylate groups may notably have the formula (II) below:

$$—R_e—Z-A \quad (II)$$

wherein:

$R_e$ is a $C_1$-$C_{12}$ alkylene group or a C=O group or further is absent; and Z is an oxygen atom or an N—$R^4$ group, $R^4$ may be a hydrogen or a $C_1$-$C_6$ alkyl group; and A is a group of formula -(QO)$_m$—$R^3$ wherein:
Q represents an alkylene group with 2 to 4 carbon atoms or a mixture of these alkylene groups;
m is an integer varying from 1 to 500; and
$R^3$ represents a hydrogen atom or a $C_1$-$C_{12}$ alkyl, aryl, alkylaryl or arylalkyl, preferably methyl group.

The copolymer generally comprises 0.001 to 80% by number, in particular 10 to 50% by number of polyoxyalkylate groups.

According to the invention, the copolymer moreover includes carboxylic groups, other than those present in acetophosphonic groups.

Preferably, these carboxylic groups fit the formula (III) below:

$$—C(O)—O—R_d \quad (III)$$

wherein:

$R_d$ represents H or a $C_1$-$C_{12}$ alkyl, aryl, alkylaryl or arylalkyl group, or an alkaline, earth-alkaline or ammonium cation.

The proportion of the carboxylic groups, other than those present in the acetophosphonate groups, in the copolymer may vary from 0 to 90%, in particular from 40 to 80% by number of carboxylic groups.

These carboxylic groups may be in the form of a non-dissociated acid. Most often, they will however be at least partly or totally neutralized, esterified or amidified.

The copolymer according to the invention generally has an average molar mass comprised between 1000 and 220,000 (Mw), preferably between 10,000 and 110,000 (Mw) as determined by SEC (<<size exclusion chromatography>>), in a polyoxyethylene standard equivalent.

The polymolecularity index Ip is preferably comprised between 1 and 5, preferably between 1.5 and 3. The polymolecularity index is the ratio between the weight molecular mass (Mw) and the number molecular mass (Mn).

The ester level in the copolymer according to the invention may vary to a great extent. It is preferably from 10 to 70%, for example from 20 to 50%.

The theoretical ester level is determined from the number of acid moles introduced (which may be determined via the acid index (or acidity index) of the polyacid used) and the number of moles of the polyoxyalkylated group introduced. The actual ester level is determined from the number of acid moles introduced (which may be determined via the acid index of the acid used) and the residual number of moles of the polyoxyalkylated group.

The ester level values given in the present description and in the examples correspond to the actual ester level.

[Method for Preparing the Copolymers According to the Invention]

According to a second aspect, the invention proposes a method for preparing the copolymer grafted with gem acetophophonated groups described above.

Several types of reactions may be suitable for preparing the copolymer according to the invention.

Notably, it may be prepared by copolymerization of suitable monomers or by modification of a polymer by grafting side groups. The latter method is also called post-grafting.

Thus, according to an embodiment, the described copolymer is prepared by copolymerization, either bulk or solution copolymerization, in the presence of a suitable catalyst, of monomers which may polymerize respectively bearing the sought groups. It is thus possible to polymerize a mixture comprising a monomer bearing a gem acetophosphonate group, a monomer bearing a carboxylic group and optionally a monomer bearing a polyoxyalkylate group.

A suitable monomer bearing the gem acetophosphonate group is notably a vinyl, (meth)acrylic, or (meth)acrylamide monomer bearing a gem acetophosphonate unit.

A monomer bearing a suitable polyoxyalkylate group is notably methoxypolyethylene glycol (meth)acrylate or (meth)acrylamide.

The monomer bearing a carboxylic group may in particular be selected from unsaturated carboxylic acids such as acrylic acid, methacrylic acid, maleic acid, fumaric acid, itaconic acid, mixtures thereof and substituted derivatives thereof or further a compound which may generate unsaturated carboxylic functions in situ, like maleic anhydride.

The copolymer according to the invention may then be obtained by copolymerization of these monomers, notably via a radical route under customary conditions in the presence of a suitable initiator.

According to another embodiment, the polymer is prepared by a so called <<post-grafting>> method. In this method, a polymer comprising a hydrocarbon chain and carboxylic side groups and optionally polyalkoxylate side groups is modified by grafting gem acetophosphonate groups.

The grafting is achieved preferably by reaction of the carboxylic groups with a gem acetophosphonate compound bearing a reactive function, notably a primary or secondary alcohol or amine group.

Also, according to a second aspect, the invention is directed to a method for preparing the copolymer described above comprising the steps:

(i) polymerizing a monomer bearing a carboxylic group, optionally in the presence of a monomer bearing a polyoxyalkylate group; and (ii) grafting the obtained polymer with a reactive gem acetophosphonate compound.

Alternatively, it is possible to polymerize the carboxylic monomer and then esterify to the desired degree the carboxylic groups with polyoxyalkylate compounds, as this is for example described in patent application FR 2 776 285, and to graft a reactive gem acetophosphonate compound. Preferably, the carboxylic monomer is polymerized and then esterified to the desired degree with polyoxyalkylate compounds, as this is described for example in patent application FR 2 776 285, and then the obtained product is grafted with a reactive gem acetophosphonate compound.

Preferably, the reactive gem acetophosphonate compound is a gem acetophosphonate alcohol or amine, the amines being preferred because of their better reactivity at low temperature and also because the amides which they generate are stable in a pH range comprised between 10 and 13.

Advantageously, the gem acetophosphonate reactive compound is of the following formula (I):

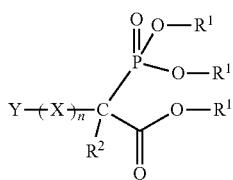

wherein:

Y is a functional group which may react with the carboxylic functions of the polymer, notably a hydroxyl, primary amine or secondary amine, isocyanate or thiol group, preferably Y is a hydroxyl, primary or secondary amine, isocyanate group;

n represents 0 or 1.

X is a spacer group, in particular a $C_1$-$C_{20}$ alkylene group optionally substituted or a sequence of groups of formula -(QO)$_m$— wherein Q represents an alkylene group with 2 to 4 carbon atoms or a mixture of these alkylene groups, preferably X is a $C_1$-$C_6$ alkylene group, m being an integer varying from 1 to 500;

$R^1$ independently of each other is a monovalent group, notably a hydrogen, a cation, notably an alkaline, earth-alkaline or ammonium cation or a $C_1$-$C_6$ and preferably $C_1$-$C_3$ alkyl group; preferably $R^1$ is a hydrogen or a $C_1$-$C_3$ alkyl group; and $R^2$ is a monovalent group, notably a hydrogen, a hydroxyl or $C_1$-$C_{10}$ alkyl group, preferably $R^2$ is a hydroxyl group or a hydrogen atom.

The polymer to be grafted will not necessarily include polyoxyalkylated groups from the moment that the gem acetophosphonate compound includes them.

The grafting reaction may advantageously be conducted at a temperature above 120° C., preferably between 150 and 200° C., and in particular between 170 and 180° C. The water formed by the reaction is then removed from the reaction mixture by evaporation, and the reaction product is recovered as a dry residue.

The carboxylic or phosphonic groups present in the reaction product may then be totally or partly neutralized.

[The Admixture]

According to a third aspect, the invention proposes an admixture for suspensions of mineral particles comprising the described copolymer.

In order to facilitate application and dosage thereof, the admixture may be present in the form of a solution in a suitable solvent.

Preferably, the suitable solvent comprises or consists of water. In certain cases, the use of another solvent, such as an alcohol or a glycol, for example ethylene glycol or glycerol, may be contemplated additionally or alternatively, for example in order to facilitate solubilization.

The polymer concentration of the admixture mainly depends on the contemplated application. Generally, the admixture comprises 1 to 50, preferably 10 to 30% by weight of polymer based on the total weight.

Alternatively, the admixture may also be present as a dry form, notably as a powder.

The formulation of the admixture may moreover comprise other customary additives, such as anti-foam agents; accelerators; retardants; water-repellents, rheology modifiers such as viscosifying agents, thixotropic agents or agents increasing the flow threshold; other dispersants, air entrainers or stabilizers of antifoam agents.

[Use of the Copolymers According to the Invention]

According to a fourth aspect, the invention proposes the use of the admixture for fluidifying suspensions of mineral particles and for maintaining workability of hydraulic binders.

As a composition comprising a hydraulic binder, mention in particular be made of cement compositions, and notably concretes, notably prefabricated concretes and ready-to-use concretes. These concretes may notably be intended for the building industry and civil engineering.

The amount of admixture to be added to the suspension of mineral particles of course depends on the sought properties and on the contemplated application. It is observed that for the preferred compositions of the invention, this dosage on the other hand varies little with the nature of the medium, and in particular little on the chemical composition of the hydraulic binders used.

Generally, for a hydraulic binder composition, notably a cement composition, a dosage of admixture from 0.01 to 2%, preferably from 0.05 to 1% and most particularly from 0.1 to 0.5% by weight of polymer based on the weight of the hydraulic binder, notably cement is suitable for most standard applications.

As an indication, an effective dosage of admixture for the preparation of a ready-to-use concrete composition is from 0.7 to 1.5% of a 20% formulation by weight of dry extract relatively to the cement weight.

The action mechanism of the polymers described is not quite understood, it being understood that that of super-plasticizers in cements has not yet been completely elucidated in a general way.

However it is assumed that the fluidifying effect of super-plasticizers mainly results from repulsion forces set into play between the adsorbed copolymers on the surface of the grains.

The combined presence, in copolymers with gem acetophosphonate groups according to the invention, of long polyoxyalkylate chains having a dispersion effect, and of phosphonate and carboxylate groups having a strong complexing capacity and an exceptional adsorption power towards di- or tri-valent cations such as calcium or aluminium, is assumed to be the reason for the particular properties as an admixture.

Moreover, it was surprisingly observed that gem acetophosphonate copolymers according to the invention have an excellent compromise between water reducing power/rheology maintenance over a large range of concentration of polyoxyalkylate chains. Further, it was observed surprisingly that the copolymers of the invention may be used at lower dosages, in compositions based on hydraulic binder, than in conventional PCPs not comprising any acetophosphonic group.

Further it was seen that the copolymers according to the invention have reduced sensitivity to soluble sulfates, notably alkaline sulfates, notably present in cements.

Indeed, the conducted tests have shown that the functionalization of the PCPs by gem acetophosphonic synthons allow perturbation of the adsorption of sulfate ions at the surface of the cement particles and therefore promotion of that of the functionalized copolymer and consequently its dispersing action.

This adsorption strongly decreases in the case of high contents of sulfate ions subsequent to adsorption competition, on the surface of the cement grains, between the sulfate ions and the copolymer. Thus, high contents of soluble sulfates, notably alkaline sulfates, generally lead to a low reduction of water, no doubt due to a lower initial adsorption of the copolymer. However, better workability of the compositions is most often observed, which is assumed to be related to better availability of the copolymer in the interstitial liquid which gives the possibility of extending the dispersing effect.

Moreover, the copolymer according to the invention advantageously has reduced sensitivity to clays, notably swelling clays, often present in sands and limestone fillers making up suspensions of mineral particles.

Indeed, the presence of clays, notably of swelling clays, in hydraulic binders affects the efficiency of super-plasticizers because of their adsorption on the surface of these clays, notably swelling clays, and insertion of their polyethoxylated grafts into the inter-folia spaces of these clays. The decrease in the maintaining of fluidity then requires an increase in the dosage of admixture, which in turn generates cost and beyond it may cause degradation of other properties such as compressive strength and durability of the material and which may moreover lead to the occurrence of cracks.

It is assumed that this advantageous effect is related to the fact that the presence of gem acetophosphonic groups in the copolymers according to the invention increases their affinity for the surface of the cement grains to the expense of that of the clay particles. This phenomenon may be due to the provision of additional anionic fillers, related to the substitution of a carboxylate group with 2 phosphonate functions and 1 carboxylate function, which makes the approach more difficult towards clays and therefore adsorption at their surface.

Preferably, the copolymers of the invention have an ester level from 30 to 70%, preferably from 30 to 50%, have low sensitivity to clays, notably swelling clays.

The obtained grafted copolymers as described above are particularly of interest as plasticizers for suspensions of mineral particles, notably cement compositions and gypsum formulations.

Indeed, they have:
high water reducing power,
insensitivity to soluble sulfates, notably alkaline sulfates, of cements,
decrease in the sensitivity to clays, notably swelling clays, present in the sands,
very good power for fluidifying hydraulic compositions with good maintenance of fluidity.

The copolymers according to the invention may be directly used in the composition of mineral particles, notably a hydraulic binder composition. They may also be applied during the milling of mineral particles, notably of the hydraulic binder, before preparing the composition.

[Compositions of Mineral Particles]

Finally, according to a last aspect, the invention is directed to a composition of mineral particles comprising the copolymer according to the invention.

The compositions thereby with admixtures have extended workability with a low dosage, including in the presence of high contents of soluble sulfate, notably of alkaline sulfates and/or of clays, notably swelling clays. Consequently they are of interest for a wide range of applications, in particular ready-to-use concretes, self-placing concretes, high or very high performance concretes (BHP and BTHP) or prefabrication concretes.

The invention will be better explained with reference to the examples which follow, given as non-limiting examples.

EXAMPLES

A. Preparation of Acetophosphonate Synthon

Preparation of 2-hydroxy-phosphono-acetic acid (HPAA)

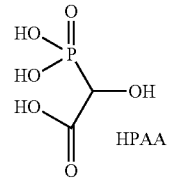

This compound is available commercially, notably under the name of Belcor575® from BWA.

This compound may also be prepared by reaction of phosphorus trichloride $PCl_3$ on glycolic acid ($HOCH_2CO_2H$) followed by a hydrolysis reaction.

This compound may also be prepared from an ethyl ester of glycolic acid and of diethyl phosphite and then hydrolyzed in an acid medium or by treatment with trimethylsilyl bromide and then hydrolyzed as described in patent EP 0 027 199.

B. Preparation of the Polymers

Examples 1A and 1B

Preparation of a Reference Polyalkoxylate Polycarboxylic Copolymer

In a 500 ml 2-neck flask provided with magnetic stirring, surmounted with a condenser and inertization with nitrogen and placed in a thermostated oil bath, a 73.57 g (323.4 mmol) of polymethacrylic acid (Mn=4,100 g/mol; dry extract=30%, acidity number 181.1 mg of KOH/g) are loaded and then 0.48 g (5.95 mmol) of soda (aqueous solution of NaOH of 50% by weight) are introduced. It is then proceeded with the loading of 34.35 g (46 mmol) of methoxypolyethyleneglycol (MPEG) with a molar mass of 750 g/mole and then of 91.60 g (46 mmol) of methoxypolyethyleneglycol (MPEG) with a molar mass of 2,000 g/mole and the temperature of the reaction medium is brought to 175° C. When the temperature of the reaction medium reaches 100° C., partial vacuum (<20 mbars) is applied to the reactor.

The moment when the reaction medium becomes homogenous is taken as T0, the time of the beginning of the reaction. The esterification reaction is left to continue for 7 h at 175° C. before letting the reaction medium return to room temperature.

An anhydrous base is obtained having a comb copolymer mass of 147.5 g i.e. 73.8% based on the initial reaction mixture.

Example 1A corresponds to a polymer with an ester level of 27.5% and Example 1B to a polymer with an ester level of 38.5%.

The ester level is measured from the acid index of the polymethacrylic acid which gives access to the number of moles of acid introduced. The determination of the number of moles of residual MPEG with GPC gives the possibility of inferring the actual ester level.

Example 2A and 2B

Preparation De Copolymers of PCP Type Grafted with HPAA According to the Invention It was shown that the simultaneous introduction of the gem acetophosphonic synthon with the polyalkoxylate compounds perturbs the esterification reaction.

By differed introduction into the reaction medium on the other hand, for example after 4 hours of reaction, it is possible to again find a grafting level of the MPEGs equivalent to that of the reference reaction without any acetophosphonated synthon.

These are the operating conditions which have been retained for the subsequent study.

In a 500 ml 2-neck flask provided with magnetic stirring, surmounted with a condenser and inertization with nitrogen and placed in a thermostated oil bath, 73.57 g (323.4 mmol) of polymethacrylic acid (Mn=4,100 g/mol; dry extract=30%, acidity number 181.1 mg of KOH/g) are loaded and then 0.48 g (5.95 mmol) of soda (aqueous solution of NaOH of 50% by weight) are introduced. It is then proceeded with the loading of 34.35 g (46 mmol) of methoxypolyethyleneglycol (MPEG) with a molar mass of 750 g/mole and then 91.60 g (46 mmol) of methoxypolyethyleneglycol (MPEG) with a molar mass of 2,000 g/mole and the temperature of the reaction medium is brought to 175° C. When the temperature of the reaction medium attains 100° C., partial vacuum (<20 mbars) is applied to the reactor.

The moment when the reaction medium becomes homogenous is taken as TO, the time of the beginning of the reaction. After 4 h of baking at 175° C., 4.11 g of acetophosphonated snython HPAA from example 1 (4% by weight) are very slowly introduced, and the esterification reaction is left to continue further for 3 h at 175° C. before letting the reaction medium return to room temperature.

An anhydrous base is obtained having a mass of grafted copolymer of 143.3 g i.e. 71.7% based on the initial reaction mixture.

The obtained solution of copolymer bearing carboxylic functions, polyether grafts and gem acetophosphonic units, is then formulated by adding 0.5% by weight of oleic amine to 2 moles of ethylene oxide (marketed under the name of NORAMOX $O_2$ by CECA) and 1.2% by weight of tributylphosphate (antifoam agent).

Finally, the product is diluted with water in order to obtain a 30% dry extract and neutralized with sodium hydroxide at pH 7.

The thereby prepared dispersant is ready for use.

Table 1 below groups the characteristics of each of the polymers obtained according to examples 1, 2A and 2B.

TABLE 1

Characteristics of the polymers according to Examples 1 and 2

| Example | Reaction mixture | % residual polyox |
|---|---|---|
| 1A | ect of sulfates EX. Grafting [molar %]1.06 | 1.06 |
| 1B | 38.5% MPEG2000 + polymethacrylic acid | 0.93 |
| 2A | 27.5% MPEG2000 + polymethacrylic acid + 4% HPAA | 0.83 |
| 2B | 38.5% MPEG2000 + polymethacrylic acid + 4% HPAA | 1.12 |

The percentages of residual polyox are obtained by GPC and are expressed in a percentage by mass of the reaction medium.

C. Evaluation of the Application Properties

1. Water Reducing Power

In order to evaluate the copolymer water reducing power, mortars were formulated by adding the said copolymers as a superplasticizer.

The composition of the prepared mortar is detailed in Table 2 below.

The examples were applied with copolymers of examples 1A, 1B, and 2A, 2B and with copolymers of examples 1A and 1B to which 4% of HPAA not grafted (in solution in the formulation) were added.

The mortar is prepared according to the following procedure:

In the bowl of a PERRIER kneader are introduced both sands, normalized sand and FULCHIRON sand. After kneading the sands for 30 seconds at a rate of about 140 rpm, within 15 seconds, the pre-wetting water is added, which represents ⅓ of the total water to be introduced. Mixing is continued for 15 seconds before leaving the mass at rest for 4 minutes. Next, the cement and the limestone filler (origin: ERBRAY provided by MEAC) are introduced and then mixing is continued for 1 minute before adding the remainder of the mixing water as well as the totality of the adjuvant within 30 seconds.

The kneader is then stopped for a few instants in order to scrape the edges of the kneading bowl, in order to have a properly homogenous mass and then mixing is continued for again 1 minute at a high rate of 280 rpm.

TABLE 2

Composition of the mortar used for evaluating workability

| Component | Mass [g] |
|---|---|
| Cement SPLC 52.5 N | 624.9 |
| Filler ERBRAY | 412.1 |
| Sand AFNOR (grain size 0/2) | 1350 |
| Sand FULCHIRON (grain size 0/0.5) | 587.7 |
| Total water | 375.1 |

The workability of the mortars formulated with the copolymers was evaluated by measuring the spreading diameter (slump flow) according to the procedure described hereafter.

A bottomless mould of a frusto-conical shape is filled, reproducing at a scale of 0.5 the Abrams cone (see NF 18-451, 1981 standard); in order to carry out spreading, the cone is lifted perpendicularly to the plate by making a quarter turn. The spreading is measured at 5, 30, 60, 90 and 120 minutes according to 2 diameters at 90° with a tape measure. The result of the spreading measurement is the average of 2 values to within +/−1 mm. The tests are conducted at 20° C.

The dosage of the copolymer is determined so as to reach a target spreading comprised between 310 and 330 mm. Unless indicated otherwise, the dosage is expressed in % by weight based on the weight of the total binder (filler+cement).

The obtained results for the mortars formulated with the copolymers are gathered in Table 3 below.

TABLE 3

Spreading of an adjuvanted mortar with copolymers of Examples 1 and 2

| EX. | Grafting [% by moles] | Dosage [%] | Spreading T [min] 5 | 30 | 60 | 90 | 120 | Loss of fluidity [%] |
|---|---|---|---|---|---|---|---|---|
| 1A (27.5% MPEG) | — | 0.65 | 315 | 320 | 325 | 315 | 285 | 9.5 |
| 1A + 4% by weight of HPAA in the formulation | 4% HPAA without grafting | 0.70 | 320 | 330 | 330 | 320 | 310 | 3.1 |
| 2A (27.5% MPEG) | 4% HPAA | 0.55 | 325 | 320 | 330 | 315 | 300 | 7.7 |
| 1B (38.5% MPEG) | — | 1.30 | 320 | 300 | 300 | 295 | 290 | 9.4 |
| 1B + 4% by weight of HPAA in the formulation | 4% HPAA without grafting | 1.30 | 300 | 290 | 280 | 275 | 280 | 6.6 |
| 2B (38.5% MPEG) | 4% HPAA | 1.10 | 325 | 325 | 325 | 330 | 325 | 0 |

Upon examining the results, it is seen that the grafting of 4% of HPAA gives the possibility of substantially lowering the dosage (passing from 0.65% to 0.55% and from 1.3 to 1.1) for an equivalent initial spreading.

Moreover it is verified that simply adding to the control formulation 4% of HPAA, which is then not grafted to the copolymer, does not allow modification of the water reducing power of the control grafted copolymer.

The improvement in the water reducing power of the acetophosphonic grafted copolymers may be explained by greater affinity for the surface of the cement grains.

2. Improvement in the Water Reducing Power with Maintenance of Fluidity

Upon reading Table 3 above it is seen that the use of an additive including a polyalkoxylated polycarboxylic copolymer grafted with 4% of HPAA in a cement formulation allows a reduction in the dosage of superplasticizer with maintenance of fluidity over time.

3. Sensitivity to Soluble Sulfates

In order to evaluate the impact of the presence of alkaline sulfates on the efficiency of the copolymers of the preceding examples as a superplasticizer, tests were conducted with mortars with variable sulfate content.

The content of alkaline sulfates of the mortars was modified by adding sodium sulfate as a powder to the cement (0.8% by weight based on the dry/dry weight of the cement). The mortar was then prepared according to the formulation indicated in Table 4 below, by adding to the mixing water the indicated dosage of copolymer.

The spreading of these mortars was evaluated as described above.

TABLE 4

Composition of the mortar used for evaluating the sensitivity to sulfates

| Component | Mass [g] |
|---|---|
| Cement SPLC 52.5N | 624.9 |
| Filler ERBLAY | 412.1 |
| Sand AFNOR (grain size 0/2) | 1350 |
| Sand FULCHIRON (grain size 0/0.5) | 587.7 |
| Na$_2$SO$_4$ | 2.58 |
| Total water | 375.1 |

The obtained results are gathered in Table 5 below. The total sulfate concentration indicated takes into account the initially present content of alkaline metals in the cement, evaluated at 0.6% by (dry/dry) weight.

It is observed that adding sulfate is accompanied by a substantial reduction of the water reducing power. Without intending to be bound by any theory, this decrease in the water reducing power seems to be related to the adsorption competition at the surface of the cement grains between the copolymer and the sulfate ions. By introducing onto the PCP backbone of the gem acetophosphonic group, it is possible to strongly minimize this loss of water reducing power, since a spreading difference of 50 mm over 2 hours is observed between non-functionalized PCP and functionalized PCP with the acetophosphonic group.

TABLE 5

Effect of sulfates

| EX. | Grafting [molar %] | Added Na$_2$SO$_4$ [% by weight of the cement] | Dosage [%] | Etalement T [mm] | | | | |
|-----|---|---|---|---|---|---|---|---|
| | | | | 5 min | 30 min | 60 min | 90 min | 120 min |
| 1B | — | — | 1.3 | 330 | 320 | 315 | 310 | 310 |
| 1B | — | 0.35% Na$_2$O equiv. or 0.8% Na$_2$SO$_4$ | 1.3 | 230 | 215 | 215 | 210 | 200 |
| 2B | 4% HPAA | 0.3 | 1.1 | 325 | 325 | 325 | 330 | 325 |
| 2B | 4% HPAA | 0.35% Na$_2$O equiv. or 0.8% Na$_2$SO$_4$ | 1.1 | 280 | 270 | 260 | 260 | 260 |
| 2B | 4% HPAA | 0.35% Na$_2$O equiv. or 0.8% Na$_2$SO$_4$ | 1.4 | 310 | 310 | 315 | 305 | 305 |

It is seen that the copolymer according to the invention tolerates much higher levels of soluble sulfates, notably of alkaline sulfates in the cement than the reference superplasticizer.

The use of the copolymers according to the invention as a superplasticizer is therefore less sensitive towards soluble sulfates, notably alkaline sulfates, in cements, as compared with the non-grafted copolymer. This observation may be explained by a complexing power of the phosphonate group and of the carboxylate group towards calcium ions which is greater as compared with that towards sulfate ions.

3. Sensitivity to Clays

The superplasticizers are also sensitive to the presence of clays in the compositions, generally in the sands.

In order to evaluate this sensitivity of the copolymers, the spreading of mortars formulated with sand polluted with a clay (montmorillonite KSF) was measured and compared with that of a mortar formulated with clean non-polluted sand.

Unless indicated otherwise, the clay percentage is expressed in % by dry weight based on the total dry sand, consisting of the AFNOR sand and of the FULCHIRON sand, the added clay is introduced with the sand before adding the pre-wetting water.

The mortars were prepared according to the formulation indicated in Table 4 above, by using cement with a strong level of alkaline metals (Ciment SPLC 52,5 N) and copolymers according to example 1A, 1B, 2A and 2B.

The results of the tests are shown in Table 6 below.

These results show that the studied copolymers according to the invention allow a reduction in the dosage used for identical performances towards sensitization to clays. The copolymers according to the invention having a higher ester level are clearly less sensitive to the clay present in the sand, to the point of widely neutralizing the harmful effect of 0.5% by weight of clay (based on the dry sand) on the fluidity of the cement composition.

TABLE 6

Clay effect

| EX. | Grafting [% by moles] | Added clay* [% by weight] | Dosage | Spreading T [min] | | | | |
|-----|---|---|---|---|---|---|---|---|
| | | | | 5 | 30 | 60 | 90 | 120 |
| 1A | — | — | 0.65 | 315 | 320 | 325 | 315 | 285 |
| 1A | — | 0.5 | 0.65 | 260 | 260 | 260 | 245 | 220 |
| 2A | 4% HPAA | — | 0.55 | 325 | 320 | 330 | 315 | 300 |
| 2A | 4% HPAA | 0.5 | 0.55 | 255 | 245 | 245 | 230 | 200 |
| 1B | — | — | 1.3 | 330 | 320 | 315 | 310 | 310 |
| 1B | — | 0.5 | 1.3 | 250 | 230 | 230 | 220 | 200 |
| 2B | 4% HPAA | — | 1.1 | 325 | 325 | 325 | 330 | 325 |
| 2B | 4% HPAA | 0.5 | 1.1 | 305 | 285 | 290 | 295 | 285 |

*The added clay is montmorillonite KSF marketed by ALDRICH

The invention claimed is:

1. A copolymer comprising a main hydrocarbon chain and side groups, wherein the side groups comprise carboxylic groups, polyoxyalkylate groups and gem acetophosphonate groups.

2. The copolymer according to claim 1, wherein the polyoxyalkylate side groups are bound to the main chain through an ester, ether or amide group.

3. The copolymer according to claim 1, wherein the gem acetophosphonate side groups fit the formula (IA) below:

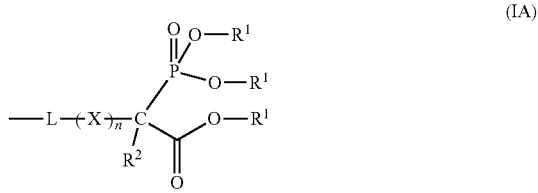

(IA)

wherein:
L represents a linkage to the main chain;
n represents 0 or 1;
X is a spacer group;
$R^1$ independently of each other is a monovalent group or a cation; and
$R^2$ is a hydrogen atom, a hydroxyl group or a $C_1$-$C_{10}$ alkyl group.

4. The copolymer according to claim 3, wherein L is an oxygen atom or —N(R⁴)—, wherein $R^4$ is hydrogen or a $C_1$-$C_6$ alkyl group.

5. The copolymer according to claim 3, wherein n is 0.

6. The copolymer according to claim 3, wherein n is 1 and X is a $C_1$-$C_6$ alkylene group.

7. The copolymer according to claim 3, wherein $R^1$ is a hydrogen atom or an alkali metal, alkaline earth metal or ammonium cation.

8. The copolymer according to claim 3, wherein $R^2$ is a hydroxyl group or a hydrogen atom.

9. The copolymer according to claim 1, wherein the polyoxyalkylate groups are of the formula (II) below:

$$-R_e-Z-A \quad (II)$$

wherein:
$R_e$ is a $C_1$-$C_{12}$ alkylene group or a C═O group or further absent; and
Z is an oxygen atom or —N(R⁴)—, wherein $R^4$ is a hydrogen or a $C_1$-$C_6$ alkyl group; and
A is -(QO)$_m$—R³ wherein:
Q represents an alkylene group with 2 to 4 carbon atoms or a mixture of these alkylene groups;
m is an integer from 1 to 500; and
$R^3$ represents a hydrogen atom or a $C_1$-$C_{12}$ alkyl, aryl, alkylaryl or arylalkyl group.

10. The copolymer according to claim 9, wherein $R^3$ is methyl.

11. The copolymer according to claim 1, wherein the carboxylic groups fit the formula (III) below:

$$-C(O)-O-R_d \quad (III)$$

wherein:
$R_d$ represents H or a $C_1$-$C_{12}$ alkyl, aryl, alkylaryl or arylalkyl group, or an alkali metal, alkaline earth metal or ammonium cation.

12. The copolymer according to claim 2, wherein the gem acetophosphonate side groups fit the formula (IA) below:

wherein:
L represents a linkage to the main chain;
n represents 0 or 1;
X is a spacer group;
$R^1$ independently of each other is a monovalent group or a cation; and
$R^2$ is a hydrogen atom, a hydroxyl group or a $C_1$-$C_{10}$ alkyl group.

13. The copolymer according to claim 3,
wherein:
L is selected from the group consisting of a bond, an oxygen atom, —N(R⁴)—, a sulfur atom and an alkylene group, wherein $R^4$ is hydrogen or a $C_1$-$C_6$ alkyl group;
X is an optionally substituted $C_1$-$C_{20}$ alkylene group or -(QO)$_m$—, wherein Q represents an alkylene group with 2 to 4 carbon atoms or a mixture of these alkylene groups, and m is an integer from 1 to 500; and
$R^1$ is selected from the group consisting of a hydrogen, a $C_1$-$C_6$ alkyl group and -(QO)$_m$R⁵, wherein Q represents an alkylene group with 2 to 4 carbon atoms or a mixture of these alkylene groups, m is an integer from 1 to 500, and $R^5$ is a hydrogen or $C_1$-$C_3$ alkyl; or
$R^1$ is an alkali metal, alkaline earth metal, or ammonium cation.

14. The copolymer according to claim 12,
wherein:
L is selected from the group consisting of a bond, an oxygen atom, —N(R⁴)—, a sulfur atom and an alkylene group, wherein $R^4$ is hydrogen or a $C_1$-$C_6$ alkyl group;
X is an optionally substituted $C_1$-$C_{20}$ alkylene group or -(QO)$_m$—, wherein Q represents an alkylene group with 2 to 4 carbon atoms or a mixture of these alkylene groups, and m is an integer from 1 to 500; and
$R^1$ is selected from the group consisting of a hydrogen, a $C_1$-$C_6$ alkyl group and -(QO)$_m$R⁵, wherein Q represents an alkylene group with 2 to 4 carbon atoms or a mixture of these alkylene groups, m is an integer from 1 to 500, and $R^5$ is a hydrogen or $C_1$-$C_3$ alkyl; or
$R^1$ is an alkali metal, alkaline earth metal, or ammonium cation.

15. A method for preparing the copolymer according to claim 1, comprising the steps:
(i) polymerizing a monomer bearing a carboxylic group, in the presence of a monomer bearing a polyoxyalkylate group to obtain a polymer; and
(ii) grafting the obtained polymer with a reactive gem acetophosphonate compound.

16. A method for preparing the copolymer according to claim 1, comprising the steps:
(i) polymerizing a monomer bearing a carboxylic group to obtain a polymer comprising carboxylic groups;
(ii) esterifying part of the carboxylic groups of the obtained polymer from step (i) with polyoxyalkylate compounds to obtain a polymer comprising carboxylic groups and polyoxyalkylate groups; and
(iii) grafting the obtained polymer form step (ii) with a reactive gem acetophosphonate compound to obtain a polymer comprising carboxylic groups, polyoxyalkylate groups and gem acetophosphonate groups.

17. An admixture comprising a solution of the copolymer according to claim 1.

18. The admixture according to claim 17, comprising 1 to 50% by weight of the copolymer based on the total weight.

19. A method for fluidifying suspensions of mineral particles comprising the use of the copolymer according to claim 1.

20. A method for maintaining workability of hydraulic binders comprising the use of the copolymer according to claim 1.

21. A method for reducing the sensitivity of hydraulic compositions to clays comprising the use of the copolymer according to claim 1.

22. A method for reducing the sensitivity of hydraulic binders to alkali metal sulfates comprising the use of the copolymer according to claim 1.

23. A composition of mineral particles comprising the copolymer according to claim 1.

* * * * *